Nov. 20, 1923.  1,474,727
H. D. NATERMAN
ADJUSTABLE VISOR FOR VEHICLE WINDSHIELDS
Filed Feb. 27, 1922
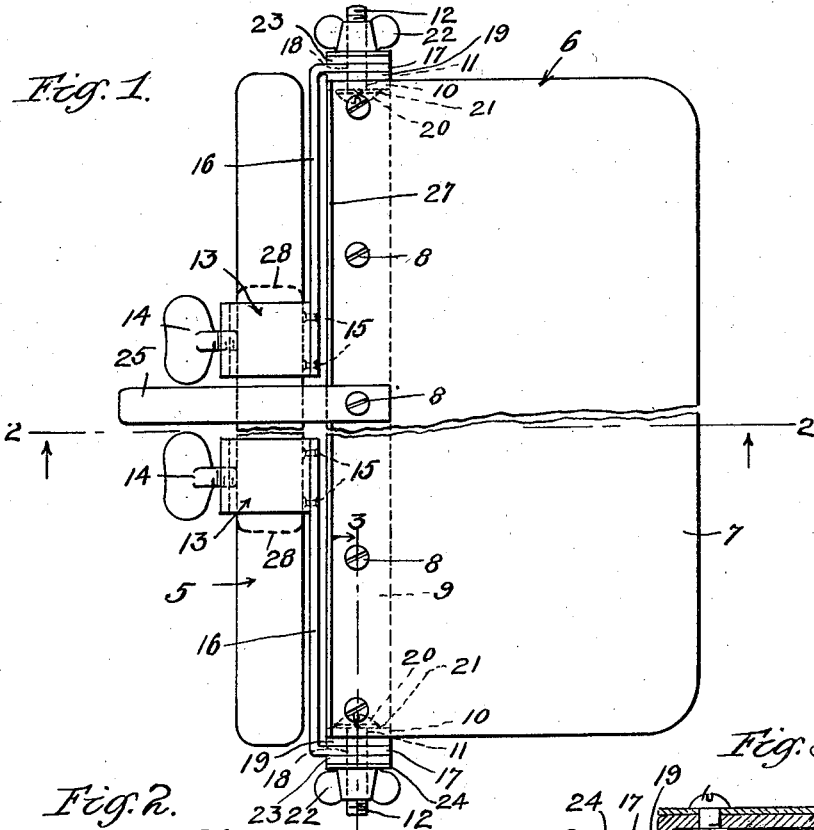
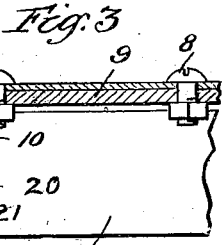
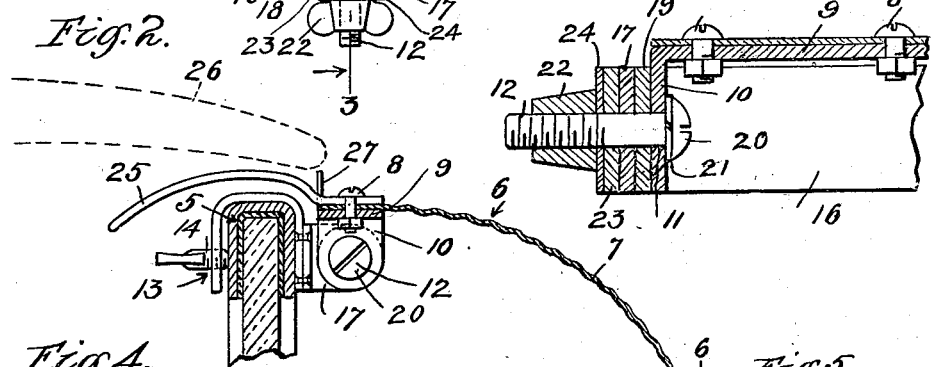
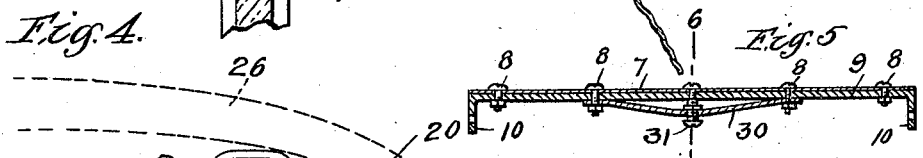
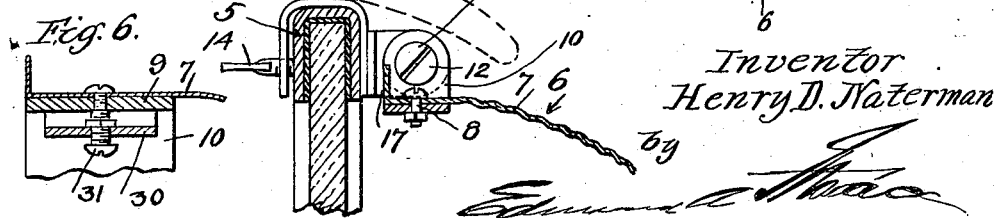
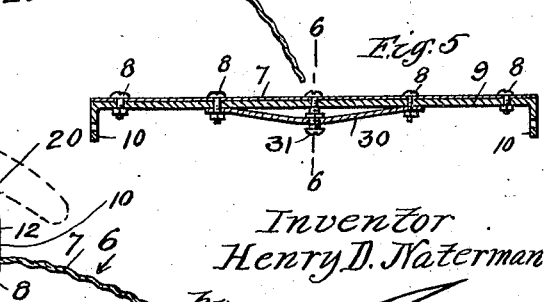
Inventor
Henry D. Naterman Patented Nov. 20, 1923.

1,474,727

UNITED STATES PATENT OFFICE.

HENRY D. NATERMAN, OF LOS ANGELES, CALIFORNIA, ASSIGNOR TO A. M. KUPFER, OF PASADENA, CALIFORNIA.

ADJUSTABLE VISOR FOR VEHICLE WINDSHIELDS.

Application filed February 27, 1922. Serial No. 539,447.

*To all whom it may concern:*

Be it known that I, HENRY D. NATERMAN, a citizen of the United States, residing at Los Angeles, in the county of Los Angeles and State of California, have invented new and useful Improvements in Adjustable Visors for Vehicle Windshields, of which the following is a specification.

My invention relates to visors adapted to be adjustably attached to the top of the frame of the upper front wind shields of auto vehicles, and is designed to protect the eyes of the accupants of the front seat of the vehicle from the glaring rays of light emanating from the sun or the head lights of an approaching vehicle, as well as preventing rain from drifting on to the occupants between the wind shield and the vehicle top.

The object of my invention is to provide a device of the class above mentioned which will be simple in construction and efficient in operation, and which may be readily attached in position to the vehicle wind shield.

Another object of my invention is to provide a construction which may be readily applied to vehicle wind shields of different widths without necessitating the forming of the visor in adjustable sliding sections as has heretofore been the practice in the manufacture of visors of this character.

A still further object of my invention is to provide means whereby the visor may be readily and conveniently adjusted to various angles by the vehicle driver while occupying his usual seat.

Still another object is to provide a construction for holding the visor tightly in its adjusted position in such manner as to eliminate all rattling noises which are very often present in visors of this character.

Other objects of my invention will be more fully disclosed in the following description and will be illustrated in the accompanying drawings, in which:

Fig. 1 is a top edge view of a wind shield showing my visor applied thereto, it being broken out in the middle to indicate greater width.

Fig. 2 is a section through the same taken on the line 2—2 of Fig. 1.

Fig. 3 is an enlarged fragmental section taken on the line 3—3 of Fig. 1.

Fig. 4 is a section similar to Fig. 2 showing the visor member attached to the securing mechanism in an alternative manner in order that it may be accommodated to vehicles having tops which project forward over the wind shields for an unusual distance.

Fig. 5 is a section through the visor member bar, illustrating a means for stiffening the same.

Fig. 6 is an enlarged sectional view through the same taken on the line 6—6 of Fig. 5.

In carrying out my invention 5 represents the upper front wind shield of an auto vehicle and 6 my visor device. The visor device comprises the visor member 7, quadrangular in shape, and preferably formed of thin sheet metal which is corrugated for the purpose of stiffening the same to give both lightness and strength, and thus eliminate the vibration which would be present were heavy metal used.

The visor member 7 is bolted at its inner edge by means of bolts 8 to a transverse metal bar of strap metal 9, having its ends bent at right angles to form ears 10, said ears being provided with oppositely disposed perforations 11 through which the bolts 12 pass.

Adapted to be clamped to the top rail of the frame of the wind shield 5 are the oppositely disposed U shaped clamping members 13, the downwardly disposed legs thereof straddling said frame and the inner leg being provided with a clamping finger bolt 14. Secured to the outer legs of the U shaped clamping members by means of rivets 15 are the extension members 16 which are preferably formed of strap metal and extend outwardly toward opposite sides of the wind shield and have their ends bent at right angles to form ears 17 which are provided with perforations 18 adapted to register with the perforations 11 and also to receive the bolts 12.

Interposed between the ears 10 and 17 and surrounding the bolts 12 are the frictional washers 19 preferably formed of leather, and interposed between the heads 20 of bolts 12 and the ears 10 are the spring washers 21.

The bolts 12 are provided with the winged clamping nuts 22 and interposed between these nuts and the ears 17 are the leather frictional washers 23, metallic wearing washers 24 resting between the washers 23 and the nuts 22. By the above recited construction it will be obvious that a hinged joint is formed between the extension members 16 and the visor member 7, thus enabling the visor member to be raised or lowered at the will of the operator and frictionally held in such adjusted position.

In order that the driver may conveniently adjust the visor without leaving his seat I have provided a lever 25 which is secured to the visor by means of one of the bolts 8 and extends between the vehicle top 26, shown in dotted lines, and the upper surface of the wind shield 5 into the vehicle, within easy reach of the driver.

On some vehicles the top 26 extends for quite a distance forwardly and downwardly of the wind shield, as shown in Fig. 4 of the drawings, and in these cases the top would interfere with the visor member. In order to overcome this objection I have detachably secured the visor member 7 to the bar 9. By this construction it will be obvious that the visor member may be removed, the bar 9 given a half turn on its pivot, and thus be lowered to clear the vehicle top and the visor member may again be secured thereto, as shown in Fig. 4.

In order to form a close joint between the visor member 7 and the vehicle top the inner edge of said visor member is turned upwardly at a right angle to form a lip 27, thus preventing the rain from beating into the vehicle over the top of the wind shield.

By forming the extension member 16 in the manner described it will be apparent that the visor member may be made of a width equal to the width of the widest wind shield and yet readily accommodate itself to wind shields of lesser width, thus, assuming that the wind shield as shown in Fig. 1 is the widest made, it will be obvious that the visor may be attached to a shield of a width equivalent to the distance between the dotted lines 28.

By attaching my visor to the wind shield it will be obvious that it will not in any manner interfere with the attaching of side curtains to the car as is often experienced when other types of visors are employed.

In order that the bar of strap metal 9 may be made of thin material for the sake of lightness and still be stiffened and prevented from sagging in the middle, I employ the following construction:— mounted underneath the bar member 9 is a truss member 30 which is secured at its opposite ends to said bar member by means of the bolts 8 and is provided midway between its ends with a threaded aperture for the reception of a screw 31, the end of said screw being adapted to engage with the under surface of member 9. By this construction it will be obvious that by an adjustment of screw 31 the central portion of the member 9 will be braced and held from sagging.

What I claim is:

1. In a visor for vehicle wind shields, a pair of visor supporting bearings, a visor mounted to pivot in said bearings, the free ends of said bearings being oppositely disposed and extending inwardly towards each other, and a wind shield clamp secured to each of the free ends of said bearings.

2. In a visor for vehicle wind shields, a pair of visor supporting bearings, a visor frictionally and pivotally mounted in said bearings, the free ends of said bearings being oppositely disposed and extending inwardly towards each other along the inner or pivotal edge of said visor, and a wind shield clamp secured to each of the free ends of said bearings.

3. In a visor for vehicle wind shields, a pair of visor supporting bearings, a visor frictionally and pivotally mounted in said bearings, the free ends of said bearings being oppositely disposed and extending inwardly towards each other along the inner or pivotal edge of said visor, a wind shield clamp secured to each of the free ends of said bearings, and a rearwardly extending visor operating arm rigidly secured to the pivotal edge of said visor.

In witness that I claim the foregoing I have hereunto subscribed my name this 3rd day of February, 1922.

HENRY D. NATERMAN.